May 1, 1934.  R. ZAWADZKI  1,956,751
INTERLOCKING GEARS FOR THE LOCKING OF
POINT THROWING LEVERS AND THE LIKE
Filed Aug. 18, 1930    6 Sheets-Sheet 1

Inventor:
Richard Zawadzki

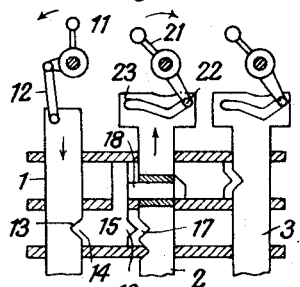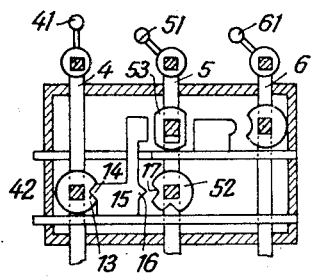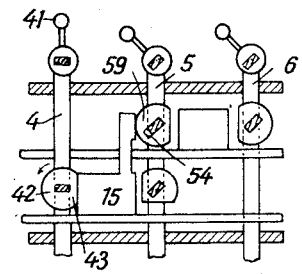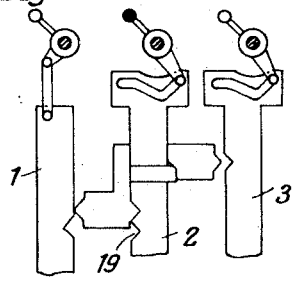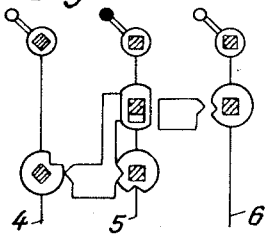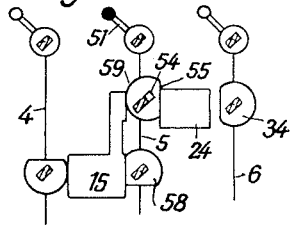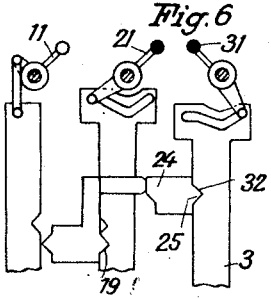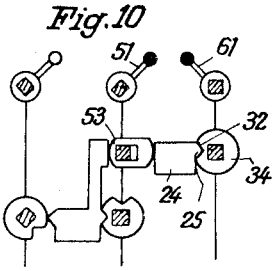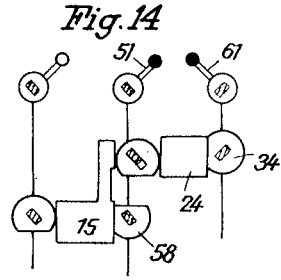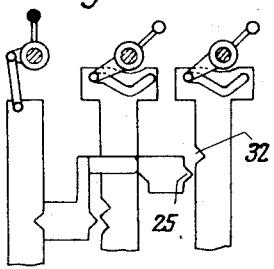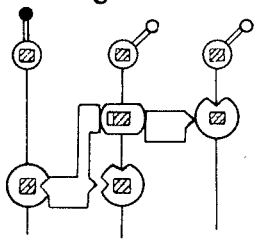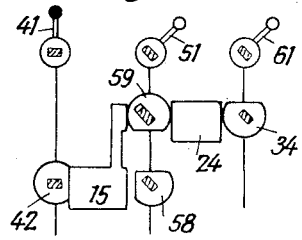

Inventor:
Richard Zawadzki

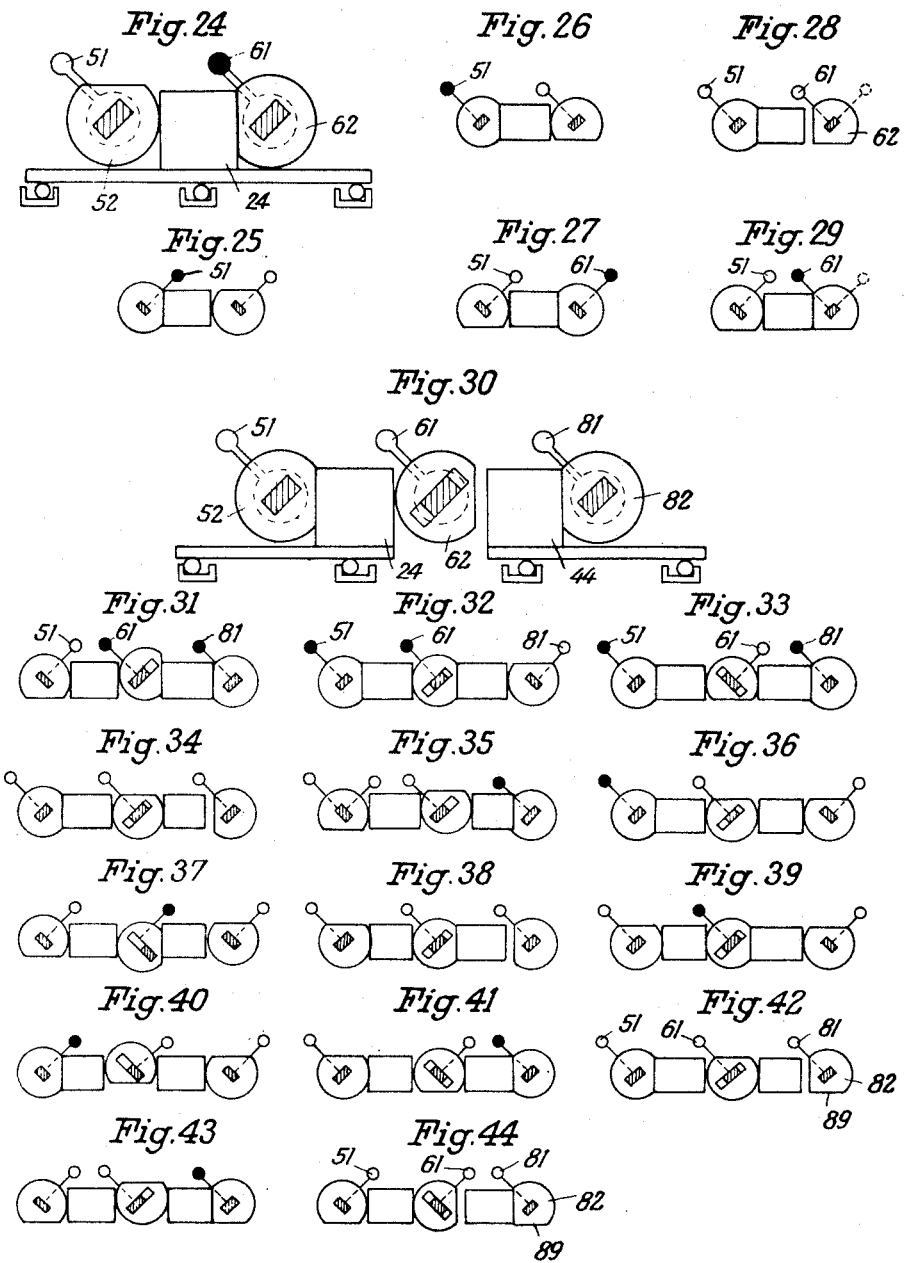

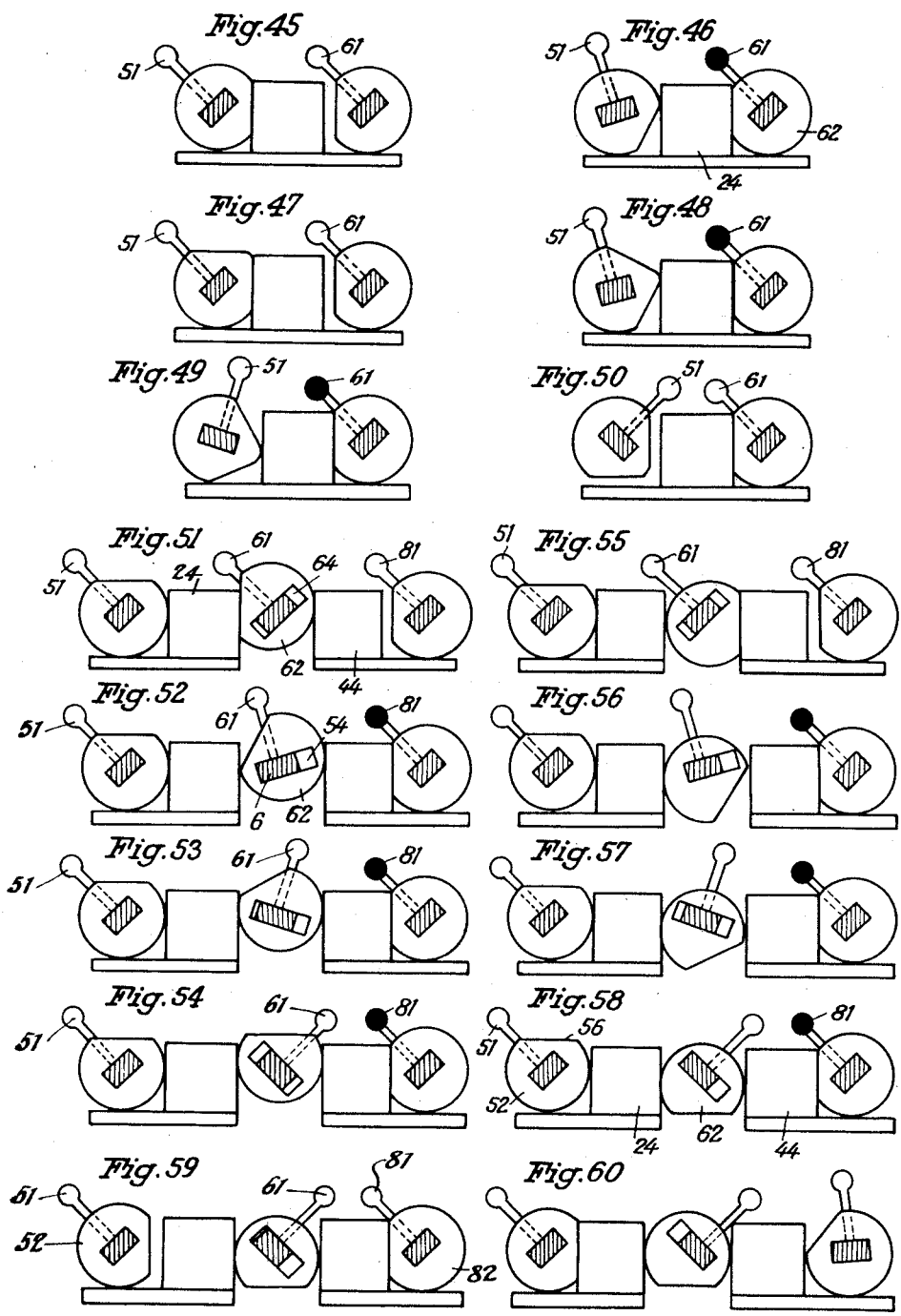

Patented May 1, 1934

1,956,751

UNITED STATES PATENT OFFICE 1,956,751

INTERLOCKING GEARS FOR THE LOCKING OF POINT THROWING LEVERS AND THE LIKE

Richard Zawadzki, Berlin-Zehlendorf, Germany, assignor to Vereinigte Eisenbahn-Signalwerke, Gesellschaft mit beschrankter Haftung, Berlin-Siemensstadt, Germany Application August 18, 1930, Serial No. 476,048 In Germany March 17, 1930

9 Claims. (Cl. 246—136)

The invention relates to interlocking gears as used for the locking of point throwing levers, signal setting levers, track setting levers and the like. These interlocking gears consist essentially in the arrangement of a tappet rod for each of these levers, which on the throwing over of the corresponding lever is displaced and moves locking pieces arranged between the tappet rods, whereby these locking pieces engage by teeth in corresponding notches on the tappet rods of other levers. The result is hereby attained that on the displacement of one tappet rod, other tappet rods are prevented from moving, that is, are locked, or previously locked tappet rods are now released.

The present invention has for its object to simplify these arrangements both in construction as well as in their arrangement and manipulation. This is essentially accomplished in the first place by providing rotatable axles or shafts instead of the displaceable rods which move the locking pieces, such axles or shafts, by means of suitably shaped elements arranged thereon, producing the same action. This improved construction of the interlocking gear offers important advantages both in the design of interlocking gears for stations, as also for the subsequent construction of the gears. Furthermore, there is given a greater comprehensive view both in the drawings of the arrangement, as well as in the completed construction. To this may be added an important saving in separate parts, and a saving in space, as the same gear according to the improved construction takes up considerably less space than the previously known gear. It is also of special importance that the links necessary with the previous systems, between tappet rods and locking levers, are dispensed with and that, furthermore, the movement of the rods necessitated the use of considerable force which is much reduced with the improved system. Other advantages of the apparatus will be seen in the course of the description of the examples represented by the accompanying drawings, in which Figures 1–3 and 1a–3a show diagrammatically how the displacement of locking pieces can take place by the rotation of an axle according to the invention.

Figures 4–7 show the previously known system, in which the movement of the locking pieces takes place by rods moved longitudinally, arranged for three levers.

Figures 8–11 show an arrangement of the apparatus according to the invention in which rotatable axles or shafts are used for moving the locking elements.

Figures 12–15 show the same arrangement in which, however, the members arranged on the axles are considerably improved.

Figure 17:
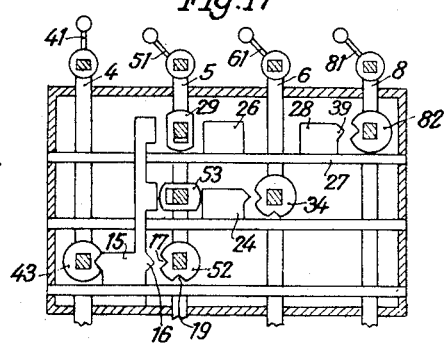

Figure 17, also showing a four lever arrangement, corresponds to the example according to Figures 5–8, while Figures 18–23 correspond to the arrangement according to Figures 12–15 for the specific case of four levers.

Figures 24–44 show the characteristic positions of the locking parts with respect to each other, Figures 24–29 for two levers, and Figures 30–44 for three levers.

Figures 45–50 show for a two lever modification the positions of the interlocking gear during the throwing over of a lever.

Figures 51–60, a similar position for a three lever modification.

Figure 61:
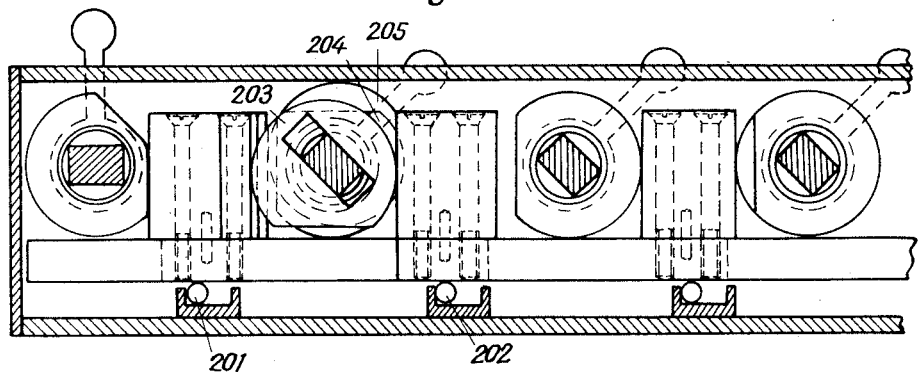
Figure 62:
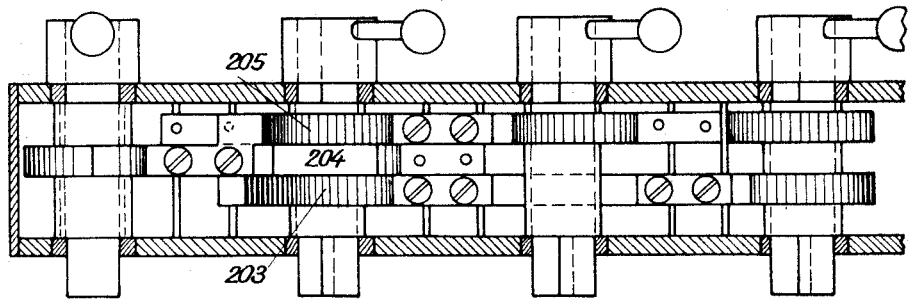

Figures 61 and 62 show in elevation and plan the constructive form and arrangement of the separate parts with an interlocking gear with four levers.

In Figures 4–60, for the better explanation of the invention, the heads of the levers, locked at the moment, are shown black.

Figure 1:
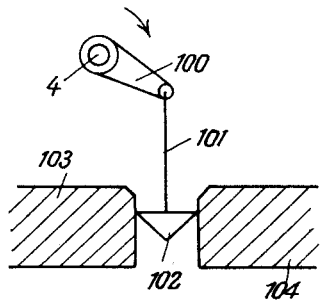
Figure 2:
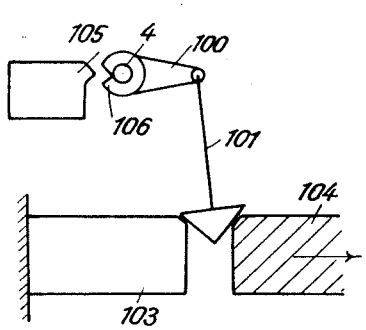

In Figures 1–3, 4 is the axle of a lever serving to throw over a rail switch point. On the axle is fixed a double lever 100, to which is pivotally attached a rod 101 which by means of a wedge shaped piece 102 on the rotation of the axle in the direction of the arrow shown in Figure 3, tends to separate the two locking parts 103 and 104 from each other. If the locking piece 104 is fixed, then the locking piece 103 is moved to the left in the direction of the arrow, if, on the contrary, the locking piece 103 is fixed, as shown in Figure 2, then the locking piece 104 is moved to the right in the direction of the arrow. On the other hand, a movement of the locking pieces towards each other is prevented if, as shown in Figure 1, the wedge shaped piece 102 is between the two locking pieces. The locking pieces may be provided, as shown as an example in Figure 2, with teeth 105, by means of which they engage in notches 106 of the lever hub.

Figure 1A:
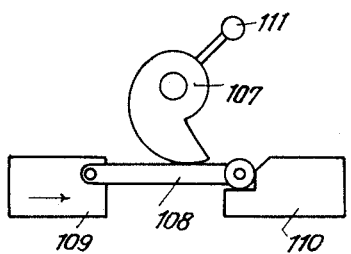
Figure 2A:
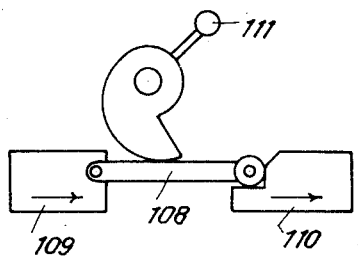
Figure 3:
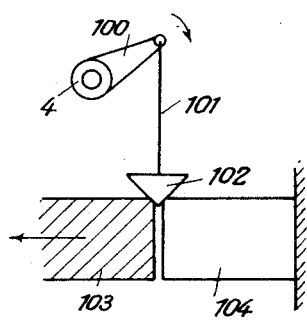
Figure 3A:
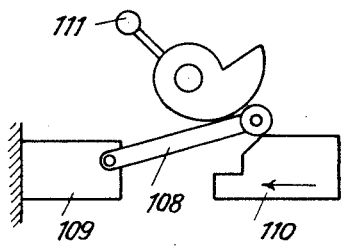

Figures 1a, 2a, 3a show a different construction, with a cam 107 fixed on the axle, and which works in conjunction with a locking bar 108, which in Figure 1a is forced between the two locking pieces 109 and 110 and determines the distance apart of these two members. If the locking piece 109 is moved by another lever in the direction of the arrow, then the locking bar transmits this movement to the other locking block 110, whereby bar 108 slides along cam 107. After the movement, the position is as shown in Figure 2a.

In the same way, a movement from right to left can take place. The rigid connection between the locking pieces is removed when the lever 111 is thrown over to the left. Then, both locking blocks 109 and 110 are separately freely movable.

Assuming now that one of the locking blocks, for example, 109, be, as shown in Figure 3a, fixed, then with a movement to the left of the other locking block, the lock is released and at the same time the lever 111 is locked in the left-hand position.

Figures 8–11 show the principle of the invention in an improved form, comparison being made with the prior art tappet bar system, which is shown in Figures 4–7.

In Figure 4 the rods 2 and 3 serve, for example, for the controlling of switch points, and the tappet bar 1 for the adjustment of a track. The bars are, the same as the axles in Figures 8–11, shown broken off for the sake of simplicity. The bars can effect the throwing over of the points or the setting of signals either mechanically through a rod, or electrically.

The ways and means by which the points, signals or tracks are adjusted dependent on the rotation of the axles, do not form the object of the invention, but only the mutual locking of the axles or levers.

If, for example, in Figure 4 the lever 11 is thrown over in the direction of the arrow, then it moves by means of a link 12, the bar 1 downward in the direction of the arrow shown. The notch 13 thereby forces out the tooth 14 of the locking piece 15 so that the locking piece is forced to the right, and engages with its tooth 16 in the notch 17 of the tappet bar 2. A movement of the tappet bar 2 is thereby prevented, that is, the tappet bar 2 is locked. By the right-hand movement of the locking piece 15 the sliding piece 18 working in the tappet bar 2 has been moved to the right. This position is shown in Figure 5.

If instead of the lever 11 in Figure 4, the lever 21 had been thrown over in the direction of the arrow, it would by means of the bolt 22 which moves in the slot of the link 23, force upwards the tappet bar 2 in the direction of the arrow shown. This movement is only possible when the tooth 16 and the notch 17 are out of engagement. By the displacement of bar 2 upwards, the sliding piece 18 is also simultaneously carried up. If now the lever 11 is thrown over to the right, as shown in Figure 6, it again forces the tooth 14 out of the notch and the tooth 16 engages in the second notch of bar 2. The locking piece 15 has at the same time moved the sliding piece 18 and with this the locking piece 24, to the right, so that the tooth 25 of this locking piece also engages in the notch 32 of the tappet bar 3. Both levers 21 and 31 are hereby locked, that is, a movement of the two levers is made impossible. If the lever 11 is again brought back into the initial position, the two point levers 21 and 31 can take up both the one as well as the other position, see Figures 4 and 7, whereby, however, in this position of the levers, a movement of the track lever 11 is made impossible, as a movement of the locking piece 15 to the right is now made impossible by the sliding piece 18 and the locking piece 24, which rests with its tooth 25 on the tappet bar 3.

With the arrangements according to Figures 8–11, the same effect is attained, here, however, according to the invention, the bars 1, 2, 3 being replaced by rotatable axles 4, 5, 6 which on rotation exercise the same function as the bars, 1, 2, 3 on the displacement. In this and the following figures, the members fitted on the axles and rotatable with the axles are shown turned over, that is, situated in the plane of the diameter of the axle, while actually they are situated at right angles thereto.

If now, for example, in Figure 8, the lever 41 is rotated to the left, axle 4 is rotated and thereby disc 42, mounted on the axle, is rotated in the same direction. Owing to this rotation, the tooth 14 is pushed out of the notch 13 so that the locking piece 15 is forced to the right, and engages by tooth 16 the notch 17 of the disc 52 arranged on the axle 5, thus undergoing the same procedure as with Figure 4. The sliding disc 53 in Figure 8 corresponds to the sliding piece 18 in Figure 4. This sliding disc is not, however, displaced every time but is, for example, inoperative in the position of the lever 51 shown in Figure 8, the same as in Figure 4 the right-hand movement of the sliding piece 18 has no effect. On the other hand, it is different with the position of sliding disc 53 shown in Figure 10.

Here, in the right hand throw position of the lever 51, the sliding disc 53 is also rotated by 90°, and has displaced the locking block 24 to the right, so that its tooth 25 engages the notch 32 of the disc 34; exactly the same procedure as in Figure 6. The position according to Figure 9 also corresponds to that according to Figure 5; the position of Figure 11 to that of Figure 7. It will therefore be seen that by rotation of axles the same effect is attainable as by the displacement of sliding bars.

A further improvement could be obtained by dispensing with the teeth as the forcing out of the teeth from the notches is only possible with a simultaneous displacement of the locking pieces, and thus necessitates a considerable expenditure of energy, which again results in the rapid wear of the several parts. The teeth could be dispensed with, if instead, the discs arranged on the axles and carrying the notches were made in a curved shape as for example elliptical, so that the displacement of the locking piece only takes place by the larger diameter taking the position of the smaller diameter of the ellipse on the rotation of the disc. With such an arrangement, however, the part of the curve would have to be flattened at which the locking occurs. It is therefore more advantageous, and this permits a more favourable reduction of the invention to practice, to make the discs mounted on the axles of circular shape, and instead of the teeth and notches, to provide flat surfaces at their periphery, which co-operate with corresponding flat surfaces of the locking pieces and in which the forcing out of a locking piece can be effected by an edge of the disc sliding on the flat surface of the locking piece. By these means, a considerable reduction in work is attained and with it a reduced wear of the parts.

If, for instance, as shown in Fig. 12, the lever 41 is thrown to the left, and thus by means of the rotation of the axle 4, the disc 42 is rotated in the direction of the arrow, the locking piece 15 which previously rested with its flat surface 43 on the flat surface of the disc 42, is moved to the right as shown in Figure 13, exactly as in the previous examples shown in Figures 4 and 8 by the forcing out of the tooth 14. The disc 59 is here also transversely displaceable, but differently from Figure 8. From Figure 13, which shows block 15 in shifted position, it will appear that disc 59 has been transversely shifted on axle 5, due to its mounting thereon in a rectangular slot 54 which extends at right angles to the position in which lever 51 is mounted on axle 5. The details of this movement will become clearer hereinafter when referring to Figures 45–60. In this case, only the connection in principle between the invention and the prior art system is to be illustrated.

The position after the displacement is seen from Figure 13. Here, the flat surface 55 of the disc 59 has been placed against the locking piece 24 by shifting of disc 59 on its axle, without, however, a displacement of the locking piece having taken place. The lever 61 is still freely movable. This corresponds to the embodiments according to Figures 5 and 9. If, however, the lever 51 is thrown over to the right, then the piece 24 is displaced to the right so that this locking piece and the disc 34 rest against each other with their two flat surfaces and the lever 61 is now blocked. In this position, the locking piece 15 lies at the same time in front of one flat surface of the disc 58, so that also lever 51 is blocked, exactly as with the examples according to Figures 6 and 10.

In the same way, Figure 15 corresponds to Figures 7 and 11. The lever 41 is blocked, since the locking piece 15 lies in front of the flat surface of the disc 42. Ordinarily, if lever 41, were thrown from this central position to the right or left, it would result in the displacement of the locking piece 15 to the right. This displacement is, however, not possible with the position of the remaining elements shown in Figure 15, as the disc 59 would then also have to move in its slot to the right, which it cannot do however as it is prevented by the locking piece 24 with the position of the disc 34 shown. Only when one of the two levers 51 or 61 is thrown over to the left, could the lever 41 be again moved. The method of operation of the arrangement according to Figures 12–15, is therefore also absolutely identical with that according to Figures 4–7, except that with the new arrangement important advantages are attained, which will be afterwards particularly mentioned.

Figure 16:
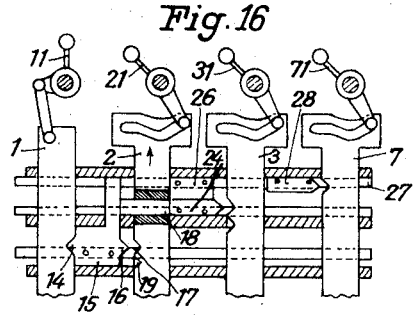
Figure 16 shows the same arrangement as in Figures 1–4, but for four levers.

The method of operation of the invention is furthermore shown in Figures 18–23 in another modification, this time for four levers. For the purposes of comparison, the known tappet bar system is here again shown in Figure 16, and the embodiment of the invention corresponding to Figures 8–11 in Figure 17. These two Figures 16 and 17 are sufficient for a comparison with the arrangement shown in Figure 18, while the separate positions of the locking pieces and the like with different lever positions are shown in the following Figures 19–23 only for the particular object of the invention according to Figure 18. From a comparison of Figure 16 with the Figures 17 and 18, it may be clearly seen that the invention presents an important simplification in the design of interlocking gears, since, for instance, with the embodiment according to Figure 16, the locking blocks are fixed on horizontal sliding bars and partially cover these, so that the drawing is comparatively difficult to comprehend. It can hardly be seen where there is room to fit locking pieces; on the other hand, with the construction according to Figures 17 and 18, it is different as the locking blocks fitted on the horizontal sliding bars can be shown in contour.

By comparing Figures 16 and 17, it is clear that on the throwing over of the levers 11, or 41, in one or the other direction, the tooth 14 is forced out and thus the locking block 15 is moved to the right. This locking block engages in both figures with its tooth 16, in the notch 17, and thus blocks the lever 21 or 51 respectively. The lever 21 is to be capable of being locked both in the one as well as in the other extreme position, for which reason two tooth notches 17 and 19 are provided.

Figure 18:
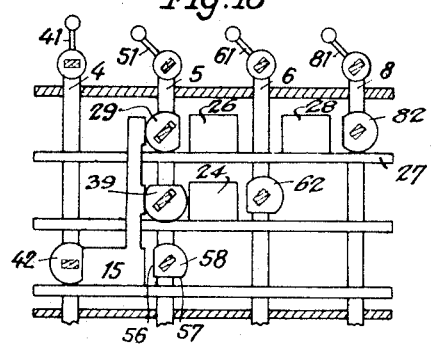

With the arrangement according to Figure 18, each flat surface on the locking block 15 corresponds to a tooth, and each flat surface on the disc 42 or 58 to a tooth notch. Consequently the disc 58 in Figure 18, instead of having two notches 17 and 19 as disc 52 of Fig. 17, has two flat surfaces 56 and 57.

Figure 19:
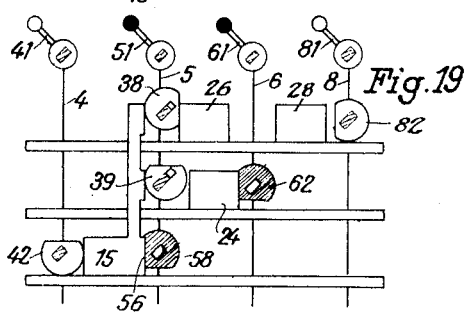
Figure 20:
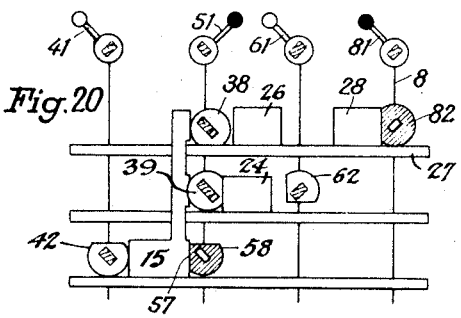

With the lever position according to Figure 19, the surface 56 serves, for example, for locking the lever 51 by the locking piece 15; with the lever position according to Figure 20, on the other hand, the surface 57 serves this purpose.

As can be seen from Figures 16 and 17, with the position shown of the levers 21 or 51, the sliding piece 18 respectively sliding disc 53 are also to be displaced to the right by the locking block 15, in order to bring the locking block 24 into engagement with the tappet rod 3 in Figure 16, or with the disc 34 of the axle 6 in Figure 17, so that lever 31, respectively lever 61, is blocked. In this position so far described, lever 71 in Figure 16 is still freely movable; it is desirable however that lever 71 should be simultaneously blocked, when lever 21 is thrown over to the right. For this purpose there is arranged on the same horizontal sliding bar 27, to which is attached locking block 26, a second locking block 28 which is intended to engage a notch in vertical sliding bar 7. Thus when bar 27 moves to the right, locking block 28 is simultaneously displaced to the right, i. e., with the right-hand position, not shown, of lever 21, in which its bar 2 is moved in the direction of the arrow, locking block 15, on the throwing over of the lever 11 from central position, would be moved to the right and thus, through blocks 18 and 26, block 28 is moved to the right so that the lever 71 would also be blocked.

The same is the case with the arrangement according to Figure 17, where, with the right-hand position of the lever 51, the sliding piece 29 would take up the position as in the position shown of the slide piece 53. In this case, with the right-hand movement of the locking block 15, also block 26 is moved to the right through the turning of disc 29 cross-wise, and thus block 26 carries through the horizontal sliding bar 27 to which it is fixed the locking block 28 with it, which by means of the tooth 39 locks the disc
82. The same procedure takes place when there are flat surfaces used instead of the teeth.

That Figure 18 corresponds to the position according to Figures 17 and 16 has already been shown above, and can be easily seen from the figure. In Figure 19 the lever 41 is now shown thrown over to the left, and has by means of the disc 42 displaced the locking block 15 to the right. This block thus has moved against the surface 56 of disc 58, and at the same time moved the slidable discs 39 and 38 to the right in their inclined respective slots. The movement of disc 38 is without effect. On the other hand, disc 39 has placed the locking block 24 against one of the flat surfaces of the disc 62 on the axle 6, so that now lever 51 is locked by the disc 58, and lever 61 by the disc 62. In Figure 20, on the other hand, where lever 41 is also thrown to the left, but where lever 51 is thrown to the right, locking block 28, which is fixed on sliding rail 27, is brought against the flat face of disc 82 fixed on axle 8, by means of slidable disc 38 which pushes block 26, also fixed on rail 27, to the right. Thereby lever 81 is locked in the left position, while lever 61 is freely movable.

Figure 21:
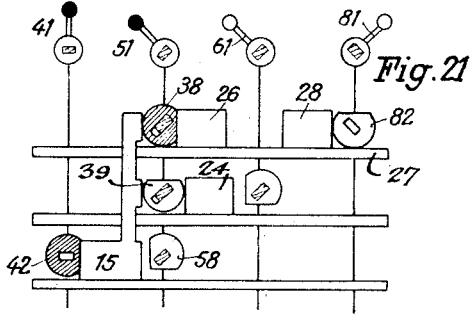

Figure 21 shows, furthermore, how removal of lever 41 from central position with lever 81 thrown over to the right, is impossibe, since lever 81, through 82, 28, 27, 26, 38, 15 and 42 prevents rotation of the axle of lever 41.

Figure 22:
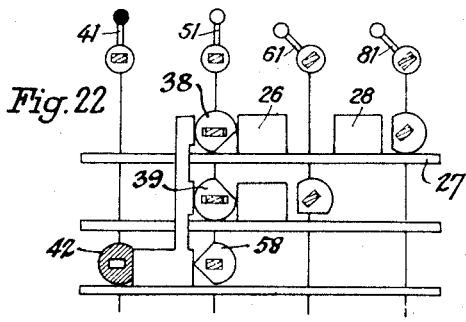
Figure 23:
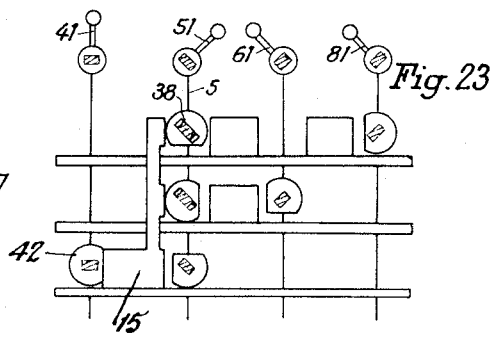

In Figures 22 and 23 lever 81 is again thrown to the left. Figure 22 shows the position during the movement of the lever 51 from the position shown in Figure 21, into the position shown in Figure 23. While the lever 51 is thrown over, it effects in the first part of its movement, up to the centre position, the displacement of the locking blocks 26 and 28 to the right. During the second part of the movement of the lever 51, there takes place a rotation of the slidable discs 38, 39 and 58. If now the lever 41 were thrown over to the right or to the left, it would move locking block 15 to the right and lock lever 51 in right hand position, the same as shown in Figure 20.

Figures 24–44 show now in principle the different lever positions which may occur, while Figures 45–60 show the levers during the movement.

In Figure 24, both levers 51 and 61 are thrown over to the left, the locking block 24 is pressed against the flat surface of the disc 62, and thus the lever 61 is locked in the left-hand position.

Figure 25 shows both levers thrown to the right, lever 51 locked in the right-hand position.

Figure 26, lever 51 locked in left-hand position.

Figure 27, lever 61 locked in right-hand position.

Figure 28, lever 61 freely movable, but capable of being locked in both positions, that is, in the left-hand as well as in the right-hand position.

Figure 29, lever 51 thrown over to the right, 61 locked in the left-hand position.

Figures 30–44 show the different positions of three levers which can be locked. In Figure 30, all three levers are freely movable. Discs 52 and 82 are here fixed on the axles, while disc 62 is arranged to slide transversely on its axle. If now lever 51 is thrown over to the right, then block 24 is moved to the right, moves disc 62 upwards to the right, and imparts to it the position according to Figure 31. 61 and 81 are thus locked. If now the lever 51 is again thrown over to the left and the lever 81 to the right, the combination shown in Figure 32 is attained, where 51 and 61 are locked. If now the lever 81 is thrown over to the left and 61 to the right, then Figure 33 results. The locked levers are, as above mentioned, shown black, the discs which cause the locking, are shaded.

Figures 34–37 show similar conditions, in which, however, the flat surface on the movable disc of the center lever 61 is differently arranged with respect to the lever. Different locking combinations are thereby produced, which can be clearly seen without further description from the levers indicated in black in these figures.

In Figures 38–41 the flat surfaces on the fixed discs of levers 51 and 81 are arranged differently with respect to their pertaining levers, so that as the levers indicated in black show, further, different locking possibilities are given.

In Figures 42–44 the disc 82 of the lever 81 has two flat surfaces, and can consequently be locked in two positions similarly to the arrangement shown in Figures 28 and 29 for two levers.

In Figure 42 all three levers are movable.

In Figure 43 the lever 81 is locked in the left-hand position.

In Figure 44, the lever 61 is thrown over to the right so that the lever 81 can also be moved to the right and by the subsequent throwing over again of the lever 61, be locked in the left-hand position, where the second locking surface 89 serves for the locking.

Figures 45–60 show the process of movement of the locking parts.

In Figure 45 both levers are freely movable. If now the lever 51 is thrown over to the right, then during the first part of the movement the locking block 24 is moved to the right and rests against the flat surface of the disc 62 of the lever 61.

Figure 47 shows another example, in which the disc 52 of the lever 51 has two flat surfaces. In the position shown, the lever 51 would be locked by the throwing over to the right of the lever 61. If, instead, as shown in Figure 48, the lever 51 is thrown over to the right it moves the locking block 24 to the right and, according to its shape, it locks at a particular angular position, for example in Figure 48 after a third of the lever movement, the lever 61, holds it fast during the next third of the movement, and releases it again during the last third of the movement, see Figures 49 and 50. By means of the two flat surfaces on its disc lever 51 is consequently capable of locking in both positions. Furthermore, the same object is here attained as with the American system with links, viz:—in the first part of an adjusting lever movement existing locks are removed and at the same time new lockings are established, in the second part the throwing over of the switch points takes place, while after the movement of the points, in the third part of the movement, either the locks are maintained, see for example Figure 46, or the blocking of the lever maintained during the middle part of the movement is again removed, see for example Figure 50. The same holds good for the following figures.

Figures 51–54 show the position during the movement with three levers dependent on each other, in which it can be at the same time seen that the slot 64 in the sliding disc 62 is eccentrically arranged. In this way, a greater displacement of the locking block 44 is attained. This block during the throwing over of the lever 61 to the right is also moved to the right shifting on its axle 6 inside the slot 64 while it is rotated.

Figures 55–58 show a different eccentric arrangement of the slot of disc 62 with a different location of the flat surface with respect to the position of lever 61. From Figure 58 it can also be seen that if lever 51 were thrown to the right, the lever 81 could also be thrown over to the right, because locking block 44 would then move to the left. This would displace movable disc 62 upwardly to the left, whereby slide block 24 would also be moved to the left, and would lie against the flat surface 56 of the disc 52. In this position, the lever 51 would be locked.

Figures 59 and 60 show a similar example with an additional different location of the flat surface on disc 52 with respect to its lever 51.

Figures 61 and 62 show as an example the practical construction of the new system. Here, as already shown diagrammatically in Figures 24 and 30, according to the invention, the horizontal sliding bars, such as 27 in Fig. 17, are carried on balls or rollers for instance shown at 201, 202, so that their movement is considerably facilitated. This is also a special characteristic of the invention, since a similar carriage could not be arranged in the prior art tappet rod system, firstly on account of the arrangement of the wide locking blocks and narrow sliding rods, and secondly also for the reason that the locking blocks in the prior art system are also stressed at right angles to their direction of movement. According to the present invention, on the other hand, the locking blocks are only stressed in the direction of their movements.

Furthermore, it will be seen from Figure 62 that the locking blocks need not be wider than the horizontal sliding bars, which results in a considerable saving in space as compared with the prior art tappet bar systems.

In the older systems, the locking blocks have the width of four horizontal sliding bars, the depth of the whole gear depends therefore on the number of the locking parts necessary at right angles to the position of the horizontal slide bars. Furthermore, in the prior art system, the teeth in the locking blocks and the notches in the vertical bars must be made to suit the particular service, so that with a subsequent change in combination in the interlocking gear, the existing teeth must be cut away and the notches must be filled in and new ones be made at different points. With the new system, on the other hand, the locking discs and sliding blocks are easily removable from their respective supports, and may be easily exchanged, altered or changed in position on their support to suit a new combination by tubular spacers of different lengths, pushed over the axles.

In the prior art system, the guide sleeves for some of the sliding blocks, such as 18 in Figure 4, are also difficult to accommodate. For these sliding blocks usually sleeves must be bolted to the bars. According to the invention, on the other hand, the sliding blocks in Figure 62, exactly like the locking disc, such as 205, may be removably bolted to their respective supports.

Owing to the locking blocks having in the present case the same width as the horizontal slide bars, such as 27, the slide bars are easily accessible during the mounting of the gear, see for example Figure 62, and the adjustment and setting of the locking blocks in exactly the right places can easily be accomplished.

A special advantage of the novel arrangement is also the considerable reduction in the number of parts of different kinds.

As an example, as to how large the saving of space is with the new system according to the invention, the following data from practical installations may be given.

With a number of 96 slide bars, the width of the interlocking gear, according to the old system is 1.4 metres while with the new system according to the invention the width is only 0.83 metres.

I claim as my invention:

1. In an interlocking gear for points, tracks or signals, in combination, a plurality of levers, a rotatable supporting axle for each of said levers, movable locking blocks located between said axles and actuating members on each axle the circumference of which members is partly circular and partly flat, for moving said locking blocks by some of the actuating members into suitable relation to other of the actuating members to prevent rotation of some of said axles.

2. In an interlocking gear for points, tracks or signals, in combination, a plurality of levers, a rotatable supporting axle for each of said levers, movable locking blocks located between said axles and actuating members on each axle the circumference of which members is on one part circular and which on the other part possesses two flat surfaces, for moving said locking blocks by some of the actuating members into suitable relation to other of the actuating members to prevent rotation of some of said axles.

3. In an interlocking gear for points, tracks or signals, in combination, a plurality of levers, a rotatable supporting axle for each of said levers, movable locking blocks located between said axles and actuating members loosely mounted upon the axles to permit their displacements upon the axles in a direction at right angles to the axles, for moving an adjacent locking block into suitable relation to the actuating member of an adjacent axle, to prevent rotation of said adjacent axle, and for locking its own axle when an adjacent axle is rotated to move an adjacent locking block.

4. In an interlocking gear for points, tracks or signals, in combination, a plurality of levers, a rotatable supporting axle for each of said levers, movable locking blocks located between said axles and actuating members loosely mounted upon the axles to permit their displacements upon the axles in a direction at right angles to the axles, the direction in which an actuating member is displaceable being in each of the two end positions of the thrown over lever inclined by approximately 45° to the central position of said lever, for moving an adjacent locking block into suitable relation to the actuating member of an adjacent axle, to prevent rotation of said adjacent axle, and for locking its own axle when an adjacent axle is rotated to move an adjacent locking block.

5. In an interlocking gear for points, tracks or signals, in combination, a plurality of levers, a rotatable supporting axle for each of said levers, movable locking blocks located between said axles, actuating members having slots in which they are mounted on said axles to move thereon in a direction transversely to said axles, for moving said locking blocks by some of the actuating members into suitable relation to other of the actuating members to prevent rotation of some of said axles, said slots being located eccentrically on said actuating members.

6. In an interlocking gear for points, tracks or signals, in combination, a plurality of levers, a rotatable supporting axle for each of said levers, movable locking blocks located between said axles, actuating members loosely mounted upon the axles to permit their displacements upon the axles in a direction at right angles to the axles, for moving said locking blocks by some of the actuating members into suitable relation to other of the actuating members to prevent rotation of some of said axles, the direction in which said actuating members are displaceable being in each of the two end positions of the thrown over lever inclined by approximately 45° to the central position of said lever, and rollers for carrying said locking blocks.

7. In an interlocking gear for points, tracks or signals, in combination, a plurality of levers, a rotatable supporting axle for each of said levers, movable locking blocks located between said axles, actuating members having slots in which they are transversely slidably mounted for moving said locking blocks by some of the actuating members into suitable relation to other of the actuating members, to prevent rotation of some of said axles, said slots being eccentrically arranged with respect to the circumference of said members, and rollers for carrying said locking blocks.

8. In an interlocking gear for points, tracks or signals, in combination, a plurality of levers, a rotatable supporting axle for each of said levers, movable locking blocks located between said axles, actuating members loosely mounted upon the axles to permit their displacements upon the axles in a direction at right angles to the axles, for moving an adjacent locking block into suitable relation to the actuating member of an adjacent axle, to prevent rotation of said adjacent axle, and for locking its own axle when an adjacent axle is rotated to move an adjacent locking block, the direction in which said actuating members are displaceable being in each of the two end positions of the thrown over lever inclined by approximately 45° to the central position of said lever.

9. In an interlocking gear for points, tracks or signals, in combination, a plurality of levers, a rotatable supporting axle for each of said levers, movable locking blocks located between said axles and actuating discs mounted upon said axles and displaceable in a direction at right angles to said axles, whereby a disc can displace at least some of said locking blocks on rotation of its pertaining axle to engage at least some of the other discs, to prevent rotation of their pertaining axles, the direction in which each disc is displaceable being in each of the two end positions of the lever inclined by approximately 45° to the central position of the lever, said discs being maintained in the desired position longitudinally of their axle by tubular spacers pushed over the axles.

RICHARD ZAWADZKI.